US012038416B2

(12) United States Patent
Nation et al.

(10) Patent No.: US 12,038,416 B2
(45) Date of Patent: Jul. 16, 2024

(54) HIGH THROUGHPUT TRIBOMETER

(71) Applicant: National Technology & Engineering Solutions of Sandia, LLC, Albuquerque, NM (US)

(72) Inventors: Brendan L. Nation, Albuquerque, NM (US); Michael T. Dugger, Tijeras, NM (US); John Curry, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 395 days.

(21) Appl. No.: 17/515,815

(22) Filed: Nov. 1, 2021

(65) Prior Publication Data

US 2022/0107254 A1  Apr. 7, 2022

Related U.S. Application Data

(63) Continuation-in-part of application No. 16/513,197, filed on Jul. 16, 2019, now Pat. No. 11,199,485.

(60) Provisional application No. 62/714,384, filed on Aug. 3, 2018.

(51) Int. Cl.
*G01N 3/56* (2006.01)
*G01N 3/04* (2006.01)
*G01N 3/16* (2006.01)

(52) U.S. Cl.
CPC .............. *G01N 3/56* (2013.01); *G01N 3/04* (2013.01); *G01N 3/165* (2013.01)

(58) Field of Classification Search
CPC ............ G01N 3/56; G01N 3/04; G01N 3/165
See application file for complete search history.

(56) References Cited

U.S. PATENT DOCUMENTS

| | | | | |
|---|---|---|---|---|
| 3,394,584 | A | * | 7/1968 | Mayer ................. G01M 3/2876 |
| | | | | 209/555 |
| 4,664,239 | A | | 5/1987 | Symes et al. |
| 5,685,554 | A | | 11/1997 | Poxleitner |
| 7,832,697 | B2 | | 11/2010 | West et al. |
| 8,071,164 | B1 | | 12/2011 | Dugger et al. |
| 9,211,621 | B2 | * | 12/2015 | Hessbruggen ......... B23Q 7/04 |
| 9,474,540 | B2 | | 10/2016 | Stokes et al. |
| 9,656,266 | B2 | * | 5/2017 | Luoma, II ............ G01N 35/025 |
| 10,024,484 | B2 | | 7/2018 | Brown et al. |

(Continued)

FOREIGN PATENT DOCUMENTS

CN         206643730 U   *   11/2017

OTHER PUBLICATIONS

U.S. Appl. No. 15/649,496, filed Jul. 13, 2017 (non-publication, abandoned Aug. 31, 2020).

(Continued)

*Primary Examiner* — Octavia Hollington
(74) *Attorney, Agent, or Firm* — Kevin W. Bieg

(57) ABSTRACT

The present invention relates, in part, to systems for characterizing force (e.g., friction, and wear). In one embodiment, a tribometer allows for wear testing of samples in a high throughput manner. A counterface is used to apply force on the surface of the sample. A carousel provides for the rapid exchange of new for old counterfaces in the tribometer test head, thereby enabling the use of a new counterface for each new wear test without the need for operator interaction.

5 Claims, 14 Drawing Sheets

(56) References Cited

U.S. PATENT DOCUMENTS

| | | | |
|---|---|---|---|
| 10,371,598 B1 | 8/2019 | Nation et al. | |
| 10,429,284 B1 | 10/2019 | Nation et al. | |
| 10,627,050 B1 | 4/2020 | Nation et al. | |
| 10,763,000 B1 | 9/2020 | Argibay et al. | |
| 10,941,485 B2 | 3/2021 | Argibay et al. | |
| 10,946,703 B2 | 3/2021 | Perotti | |
| 11,199,485 B1* | 12/2021 | Nation | G01L 3/08 |
| 11,435,270 B2* | 9/2022 | Mayer | G02B 7/16 |
| 11,781,958 B2* | 10/2023 | Nation | G01N 3/56 |
| | | | 73/7 |
| 11,867,006 B2* | 1/2024 | Bender | E21B 19/18 |
| 2014/0273245 A1* | 9/2014 | Ochranek | G01N 35/025 |
| | | | 436/54 |
| 2014/0334991 A1 | 11/2014 | Johnson et al. | |
| 2017/0234087 A1* | 8/2017 | Gaska | E21B 15/00 |
| | | | 175/85 |
| 2018/0291696 A1* | 10/2018 | Amerson | E21B 19/18 |

OTHER PUBLICATIONS

Davidson, M. et al., "High Throughput Friction and Wear Tester," Sandia Report No. SAND2019-0897M, 2019 (2 pages).

Nation, B.L. et al., "In-Situ Testing: An Exploration of Increasing Design Complexity," Sandia Report No. SAND2015-10978C, 2015 (21 pages).

Nation, B.L. et al., "In-Situ Exploration of Lubricating Fluid Properties in Confined Mechanical Contacts," Sandia Report No. SAND2015-3865C, 2015 (24 pages).

\* cited by examiner

HIGH THROUGHPUT TRIBOMETER

CROSS-REFERENCE TO RELATED APPLICATIONS

This application is a continuation-in-part of U.S. application Ser. No. 16/513,197, filed Jul. 16, 2019, which claims the benefit of U.S. Provisional Application No. 62/714,384, filed Aug. 3, 2018, both of which are hereby incorporated by reference in their entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates, in part, to systems for characterizing force (e.g., friction and wear). In one embodiment, a tribometer allows for wear testing of samples in a high throughput manner.

BACKGROUND OF THE INVENTION

Current state-of-the-art generally relies on single sample testing of material characteristics. Standardized methods typically require a particular testing speed to obtain performance results, such that increasing the testing speed is not a viable strategy to increase throughput or to enhance resolution. Accordingly, there is a need for improved testers (e.g., wear and friction testing).

SUMMARY OF THE INVENTION

1. The present invention is directed to a system to rapidly and automatically exchange the counterface of a high throughput tribometer. The system comprises a carousel comprising a plurality of exchange tools; a selector motor for rotating the carousel and placing one of the exchange tools in an exchange position with respect to a test head of the tribometer; and an exchange drive motor for unthreading a counterface from the test head or threading a counterface into the test head.

Definitions

As used herein, the term "about" means+/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates, in part, to systems for characterizing force (e.g., friction and wear). In one embodiment, a tribometer allows for wear testing of samples in a high throughput manner.

Systems for Wear Testing

As described in U.S. application Ser. No. 16/513,197, a system for wear testing can comprise a plurality of testers, in which each tester can be independently controlled to apply a particular force to a sample(s). In one embodiment of the system, each tester can be in proximity to one sample, thereby allowing each tester to conduct wear tests on each sample in an independent manner. Alternatively, the system can comprise a plurality of testers is in proximity to one sample, thereby allowing each tester to conduct wear tests on different portions of the same sample.

Each tester can include one or more components to apply a force to a sample surface. In one embodiment, a tester includes a load arm having a proximal end and a distal end. Whereas the distal end is free and located in proximity to the sample, the proximal end is attached to a frame or mount. The distal end can be associated with one or more ball holders having a ball, in which the ball is used to apply a force to the sample surface. Alternatively, the distal end can be associated with one or more pin holders having a pin, in which the pin is used to apply a force to the sample surface.

Furthermore, the distal end can include one or more attachment positions, in which each attachment position can be configured to be attached to a ball holder, a pin holder, a load (e.g., a deadweight load), a weight cup (e.g., configured to hold one or more weights, thereby providing a load), and/or an electronic actuator load (e.g., configured to apply a load upon activation of an electromagnetic coil).

A joint (e.g., low friction yoke) can be disposed on the proximal end of the load arm, which can facilitate pivoting and rotating of the load arm (e.g., to facilitate changing of the ball holder or pin holder). A loading cell can also be provided in proximity to the proximal end of the load arm, thereby allowing applied forces to be measured.

Generally, wear tests can include contacting the test surface with a material (e.g., provided as a ball) under a particularized motion track. The motion track can be implemented by maintaining the ball in a stationary position and moving the sample (e.g., by use of a motion stage and/or a positioning stage). The sample, in turn, can be provided in a mount plate, which can include a plurality of sample holders. Each holder can be configured to provide a separate sample. Furthermore, the sample holder can be configured to provide at least one sample in proximity to the distal end of at least one load arm, thereby allowing the ball to contact the sample surface.

Figure 1A:
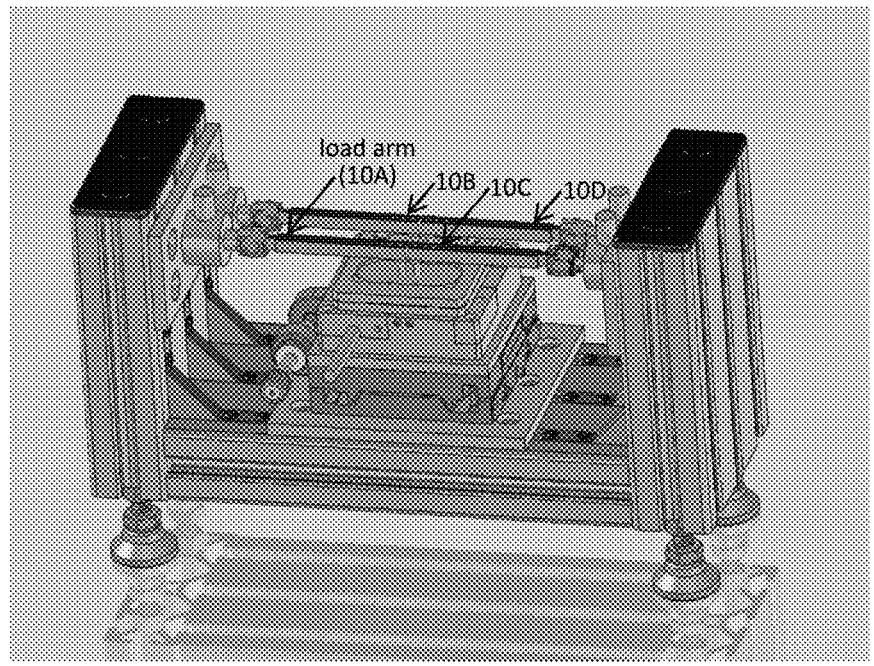
FIG. 1A-1C shows schematics of an exemplary system for wear testing. Provided are (A) an exemplary system without an enclosure and (B,C) various components of an exemplary system.

FIG. 1A shows an exemplary system for wear testing, in which the system includes four testers 10A-10D. Any number of useful testers can be present, e.g., two, three, four, five, six, etc. within the system. Each tester can be attached directly or indirectly to a housing, in which the housing can include vertical walls (e.g., for attaching load cell mount(s)) and horizontal walls (e.g., for supporting one or more stages and/or mount plates).

Figure 1B:
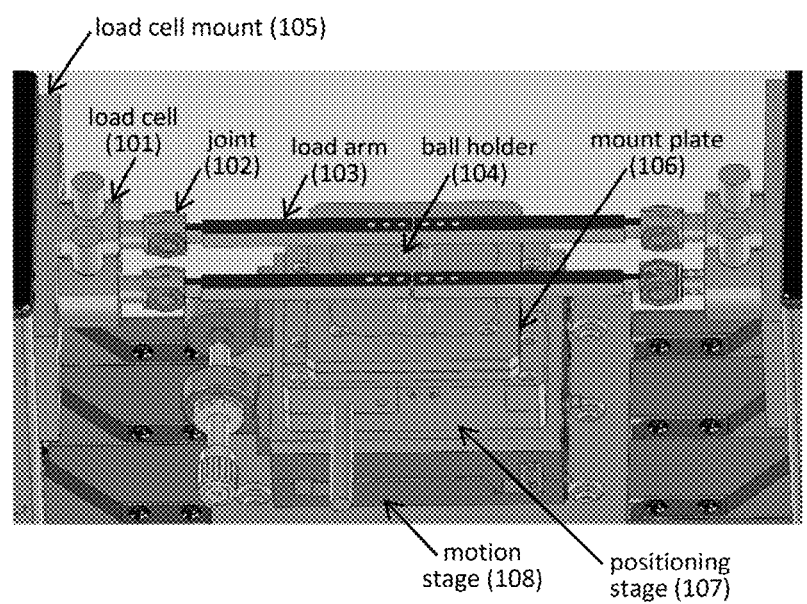
Figure 1C:
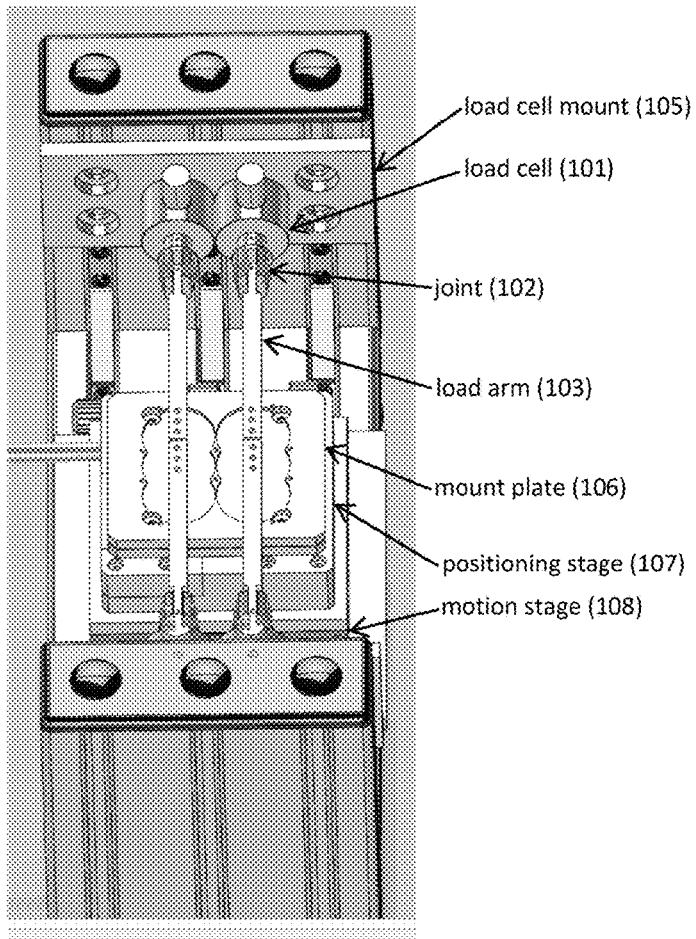

FIG. 1B shows various components for an exemplary system having a tester attached to a load cell mount 105 and in proximity to a mount plate 106, which in turn is supported by a positioning stage 107 and a motion stage 108. The exemplary tester includes a load cell 101 attached to the load cell mount 105, a joint 102 disposed between the load cell 101 and the load arm 103, and a ball holder 104 disposed at the distal end of the load arm 103. As seen in FIG. 1C, more than one load cell 101 can be attached to each load cell mount 105.

Figure 2A:
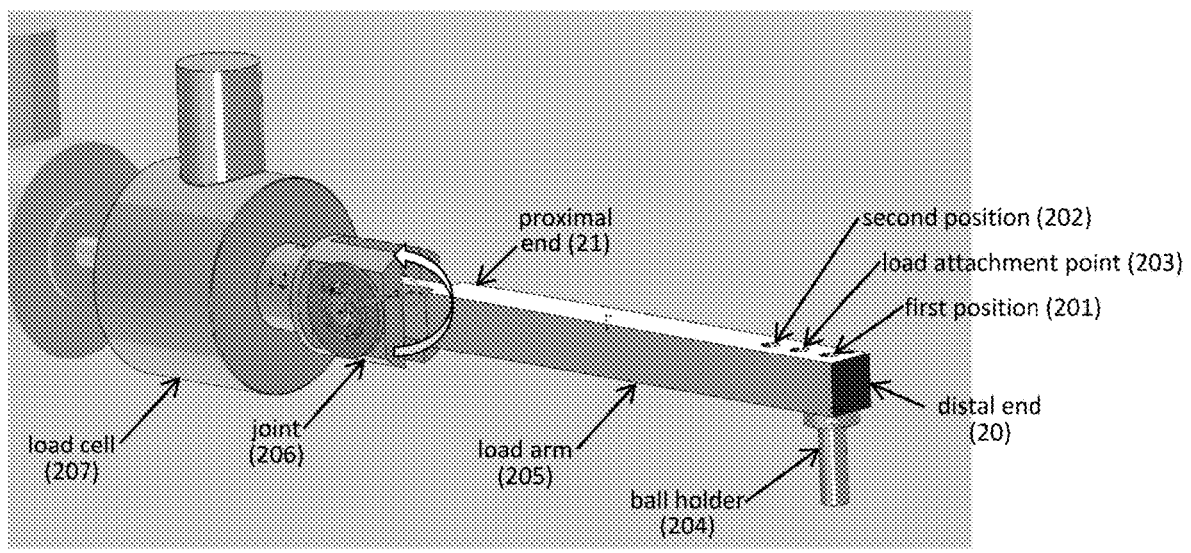
FIG. 2A-2B shows schematics of (A) an exemplary load arm with various attachment positions and (B) an exemplary load arm having a weight cup.

The tester can have any useful components to facilitate movement of the load arm and testing of the sample. FIG. 2A provides an exemplary load arm 205 with a rotating joint 206 that allows the arm to be moved in relation to a rigid, non-moving load cell 207 located at the proximal end 21. Furthermore, the distal end 20 of the load arm 205 can various attachment positions to facilitate attachment of one or more ball holders 204 or other components to apply a load to the sample surface. In one instance, the distal end 20 can include a first attachment position 201 configured to provide a ball holder at a first location, a second attachment position 202 configured to provide a ball holder at a second location, and/or a load attachment position 203 configured to apply a load to the end of the load arm. The loading attachment position can be used to attach a deadweight load, a weight cup, and/or an electronic actuator load.

Figure 3A:
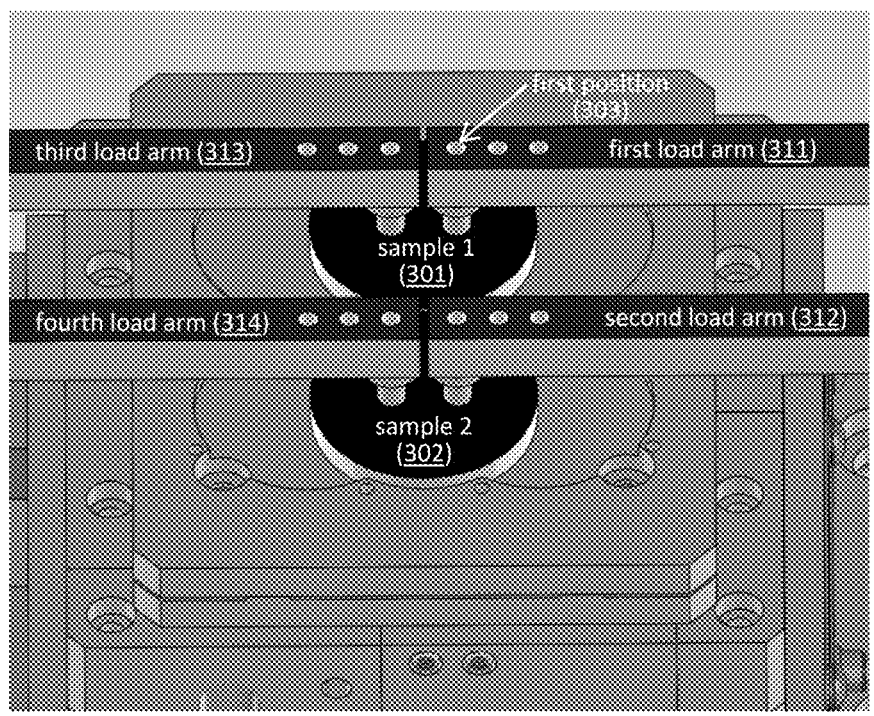
FIG. 3A-3B shows an exemplary system configured for testing two samples. Provided are (A) top view and (B) side view schematics.
Figure 3B:
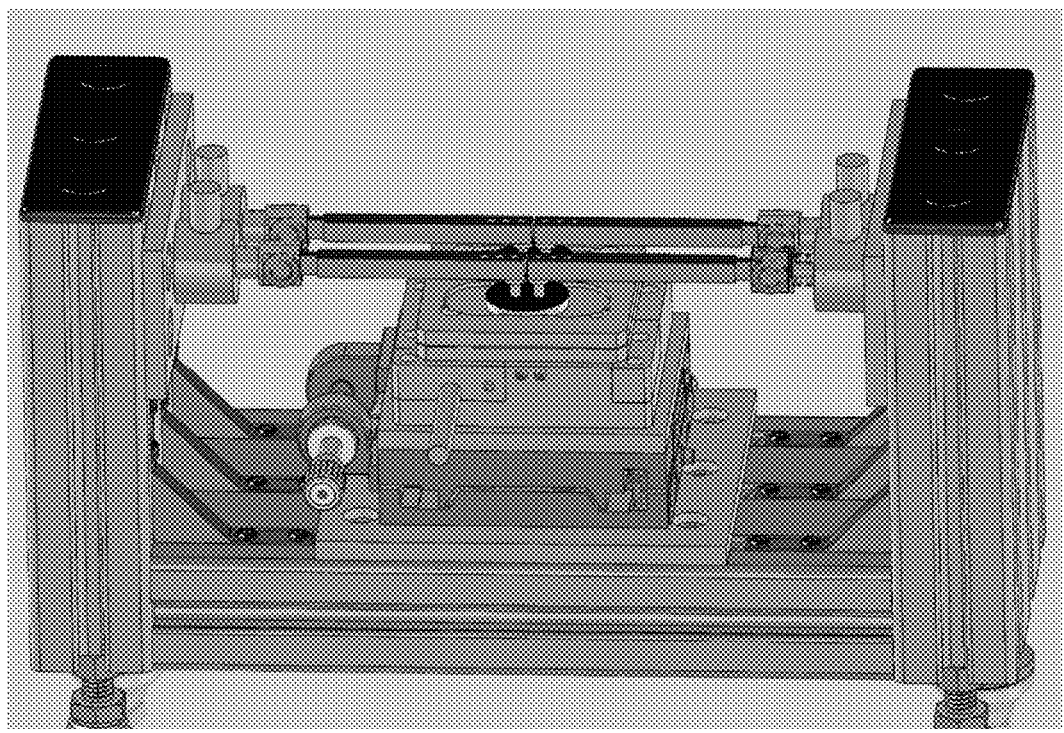
Figure 4A:
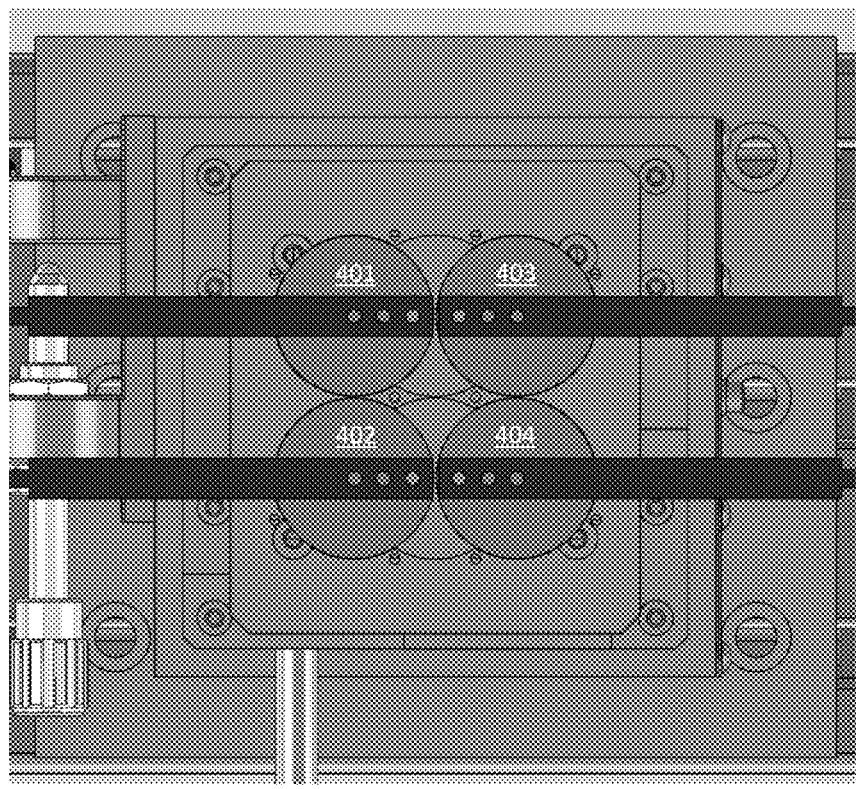
FIG. 4A-4B shows an exemplary system configured for testing four samples. Provided are (A) top view and (B) side view schematics.
Figure 4B:
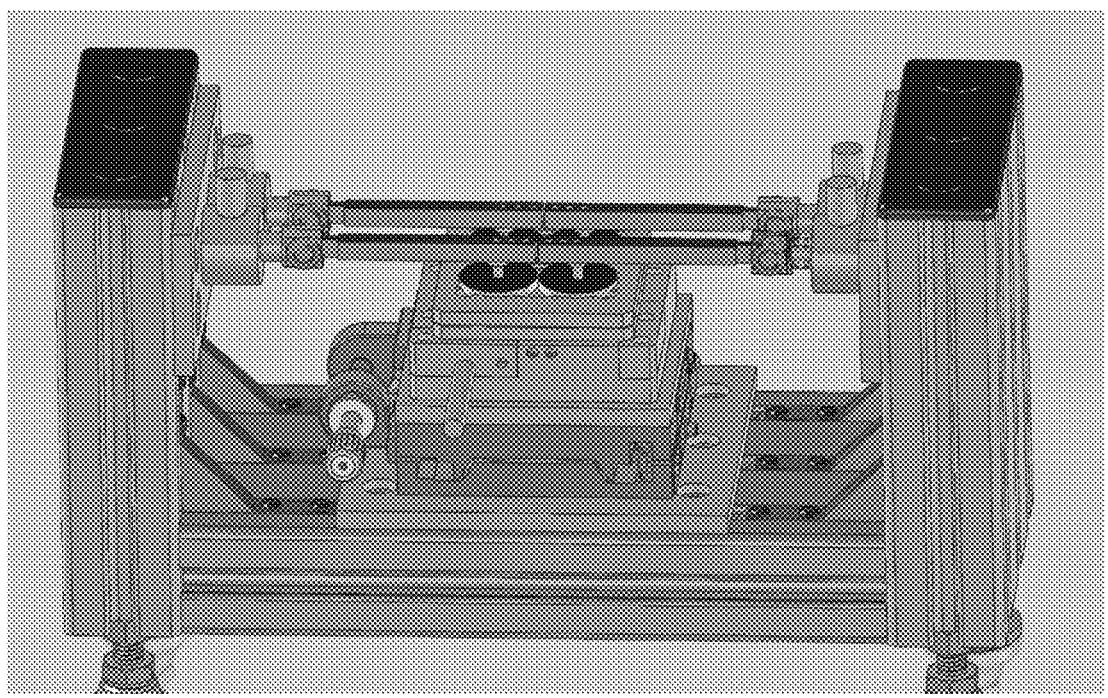

The location of the ball or pin holders can be configured to test samples in any useful mode. In one non-limiting embodiment, as seen in FIG. 3A-3B, a ball or pin holder is provided at the first position 303 of each load arm 311,312, 313,314, thereby providing four wear tracks on two samples 301,302 (e.g., two wear tracks on each sample). In another non-limiting embodiment, as seen in FIG. 4A-4B, a ball or pin holder is provided at the second position of each load arm, thereby providing four wear tracks on four samples 401,402 (e.g., one wear track on each sample).

The system can include one or more load actuators (e.g., electronic load actuators) or a plurality of load actuators. In one non-limiting instance, each load actuator is configured to apply a load to the ball or pin holder. In another instance, each load actuator is located in proximity to the distal end of the load arm. The system can include a frame configured to support the load actuator(s) and/or to provide the load actuator(s) in proximity to the distal end of the load arm. The frame can include, e.g., one or more vias to provide an electrical connection (e.g., a wire or cable) to the one or more load actuators (e.g., one or more electronic load actuators). The frame can be optionally attached to the housing.

Figure 2B:
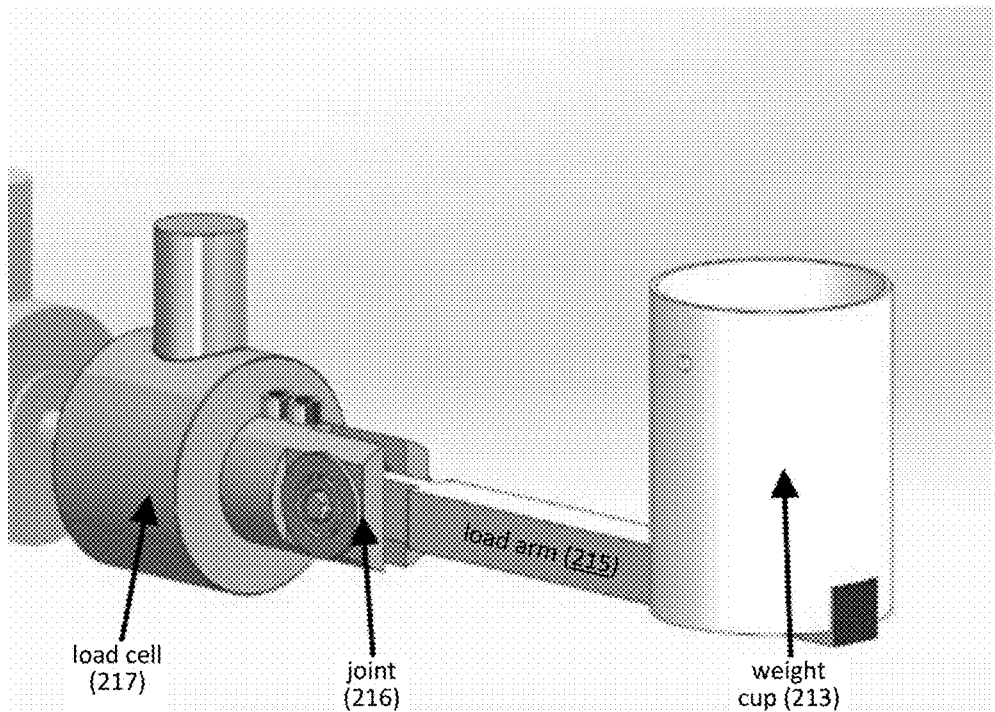
Figure 5:
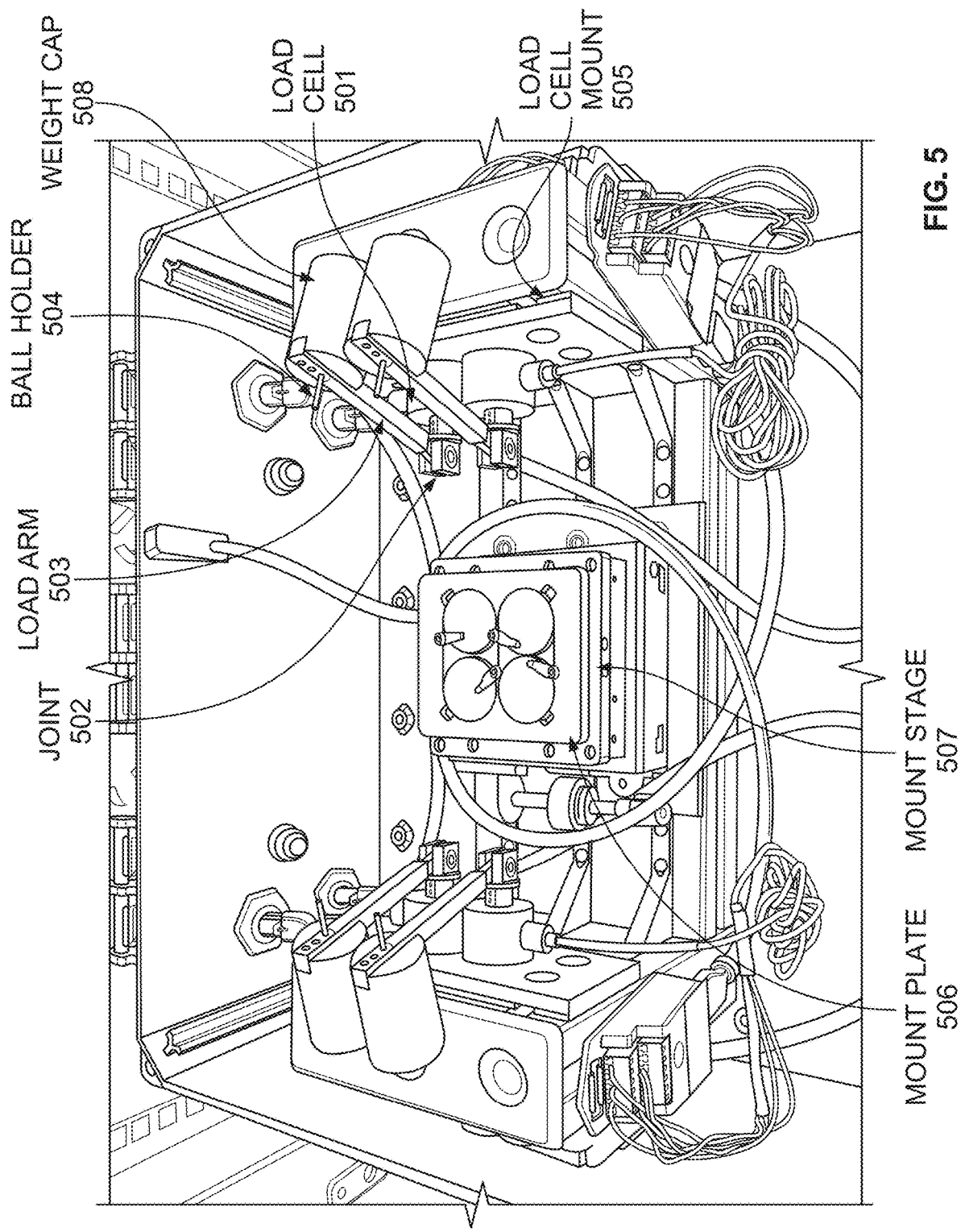
FIG. 5 shows a photograph of an exemplary system for wear testing.

As seen in FIG. 2B, the testing arm can include a load arm 215 with a joint 216 disposed between a load cell 217 and a weight cup 213 configured to hold one or more weights (e.g., ball bearings of particularized weight). FIG. 5 provides a photograph of an exemplary system having a weight cup. The system can include a plurality of testers, in which each tester includes a load cell 501 attached to a joint 502 disposed on the proximal end of the load arm 503, a ball or pin holder 504 and a weight cup 508 disposed on the distal end of the load arm 503, a load cell mount 505 attached to the load cell 501 and a housing of the system, a mount plate 506 including at least one sample holder in proximity to at least one load arm, and a stage (e.g., a motion stage 507) configured to position and/or move the mount plate.

Figure 6:
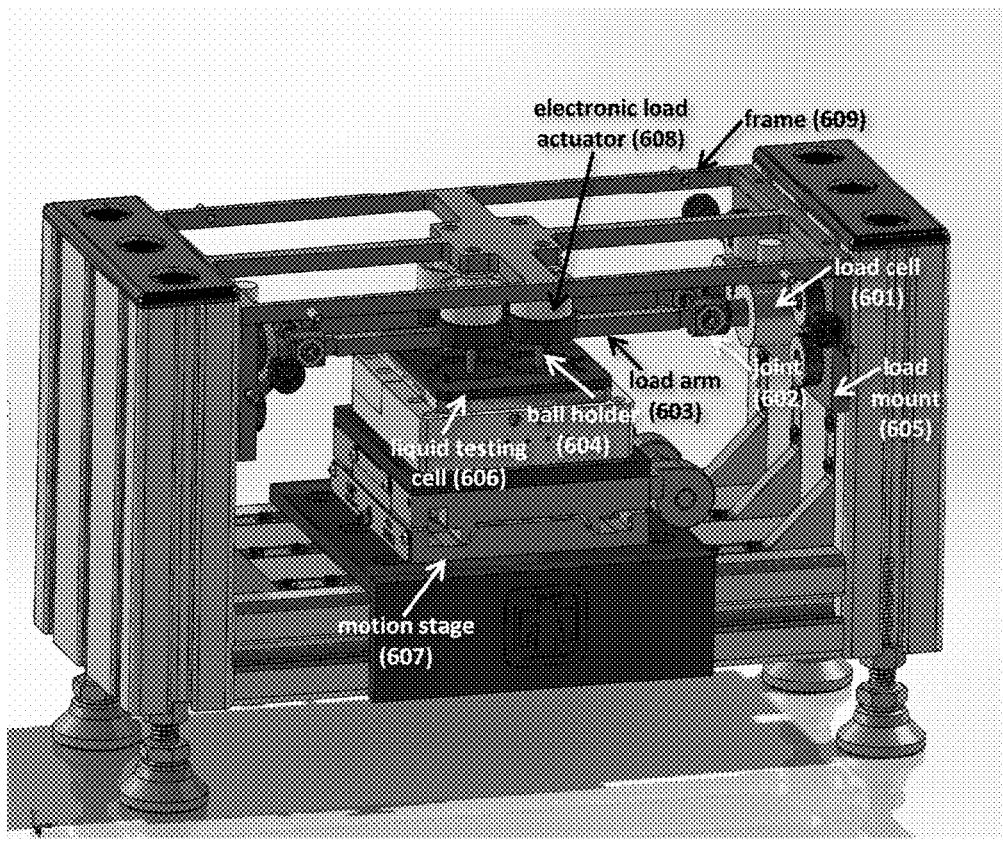
FIG. 6 shows an exemplary system including electronic load actuators and a liquid testing cell.

As an alternative to weight-based loads, the system can include the use of one or more electronic load actuators to apply a load. FIG. 6 provides a schematic of an exemplary system having such electronic load actuators. The system can include a plurality of testers, in which each tester includes a load cell 601 attached to a joint 602 disposed on the proximal end of the load arm 603, a ball or pin holder 604 and an electronic load actuator 608 disposed on the distal end of the load arm 603, a load cell mount 605 attached to the load cell 601 and a housing of the system, an optional liquid testing cell 606 for use with a mount plate including at least one sample holder in proximity to at least one load arm, a stage (e.g., a motion stage 607) configured to position and/or move the mount plate, and a frame 609 configured to support the one or more electronic load actuators 608.

The system can also include one or more optical spectroscopy assemblies configured to obtain optical measurements (e.g., Raman spectroscopy measurements, optical microscopy measurements, etc.). In one embodiment, an optical spectroscopy assembly is configured to transmit an optical signal to each sample holder. In another embodiment, each tester (e.g., on the distal end of each load arm) is coupled to an optical spectroscopy assembly.

The optical spectroscopy assembly can include any useful components, such as a fiber optic cable or an optical fiber (e.g., configured to provide, transmit, and/or receive an optical signal, such as from an optical source, e.g., a laser, and/or to a spectrometer, e.g., a Raman spectrometer), an objective assembly (e.g., configured to provide, transmit, receive, and/or focus an optical signal), a filter (e.g., a Raman filter, a dichroic filter, etc.), a lens (e.g., a half-ball lens), a collimator, a mirror, a focusing optic, an optical pump, a coupler, etc.

In one embodiment, the optical spectroscopy assembly includes a first optical fiber (e.g., a fiber optical cable) configured to provide an optical signal (e.g., and/or transmit an optical signal emitted from the half-ball lens); an objective assembly configured to focus the optical signal, thereby providing a focused optical signal (e.g., and/or transmit an optical signal emitted from the half-ball lens); a half-ball lens disposed within the ball or pin holder; and a second optical fiber configured to transmit the focused optical signal from the objective assembly to the half-ball lens. In some embodiments, the second optical fiber is further configured to receive the optical signal emitting from the half-ball lens. In other embodiments, the assembly includes a third optical fiber (e.g., a collection fiber) configured to collect the optical signal emitting from the half-ball lens.

Figure 7A:
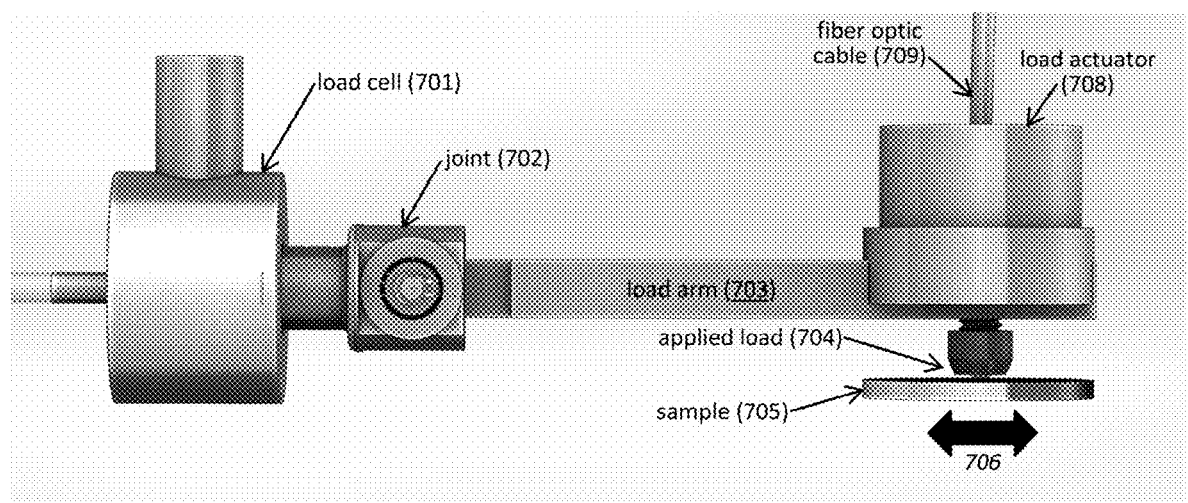
FIG. 7A-7D shows an exemplary system having an optical spectroscopy assembly (e.g., for Raman spectroscopy). Provided are (A) a side view and (B) a cross-sectional view of the exemplary system, (C) a detailed, cross-sectional view of the ball holder, and (D) a perspective view of an exemplary system having a frame.

FIG. 7A provides an exemplary optical spectroscopy assembly having a fiber optic cable 709 coupled to a load actuator 708 and configured to provide an optical signal to the ball or pin holder (e.g., and to the ball or pin within the holder) providing an applied load 704 to a sample 705 (e.g., configured to be moved 706, such as by use of a stage described herein). The optical spectroscopy assembly can be configured to transmit the optical sample to each sample holder (e.g., and to the sample within the sample holder). In one instance, the optical spectroscopy assembly is configured to be disposed on the distal end of a load arm 703, in which the load arm 703 is coupled to a load cell by a joint 702.

Figure 7B:
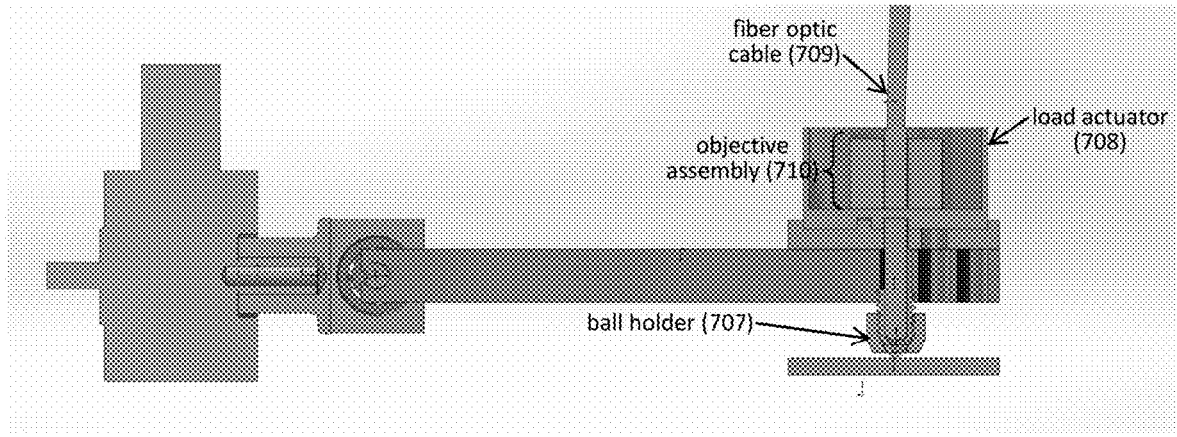

FIG. 7B provides a cross-sectional view of an exemplary optical spectroscopy assembly, in which the fiber optic cable 709 is inserted through an orifice disposed within the load actuator 708 and is coupled to an objective assembly 710 disposed within the load actuator. The objective assembly can include any useful components to receive an optical signal from the fiber optical cable and transmit the signal to the half-ball lens. Optionally, the objective assembly can be configured to provide a focused optical signal. Exemplary components include one or more optical connectors, lenses, and/or magnification objectives. As also seen in FIG. 7B, the objective assembly 709 is coupled to the ball holder 707. In use, an optical signal is transmitted from the fiber optic cable, through the objective assembly, and then to the ball holder. In some instances, the ball holder includes a lens in proximity to the sample surface, such that the optical signal is transmitted from the objective assembly to the lens, thereby transmitting the optical signal (e.g., the focused optical signal) in proximity to the sample surface.

Figure 7C:
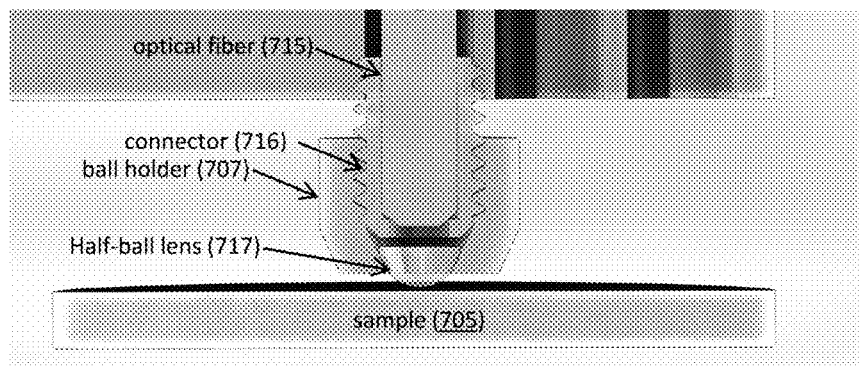

The optical signal from the objective assembly can be provided to the ball or pin holder in any useful manner. As seen in FIG. 7C, an optical fiber 715 is disposed between the objective assembly and the half-ball lens 717 disposed within the ball holder 707. Optionally, a connector can be employed to provide the distal end of an optical fiber 715 in proximity to the half-ball lens 717. The half-ball lens can perform two different functions, including providing a wear surface to abrade or rub against a sample surface, as well as providing an optical path from an external source (e.g., a laser) to the sample surface.

Figure 8A:
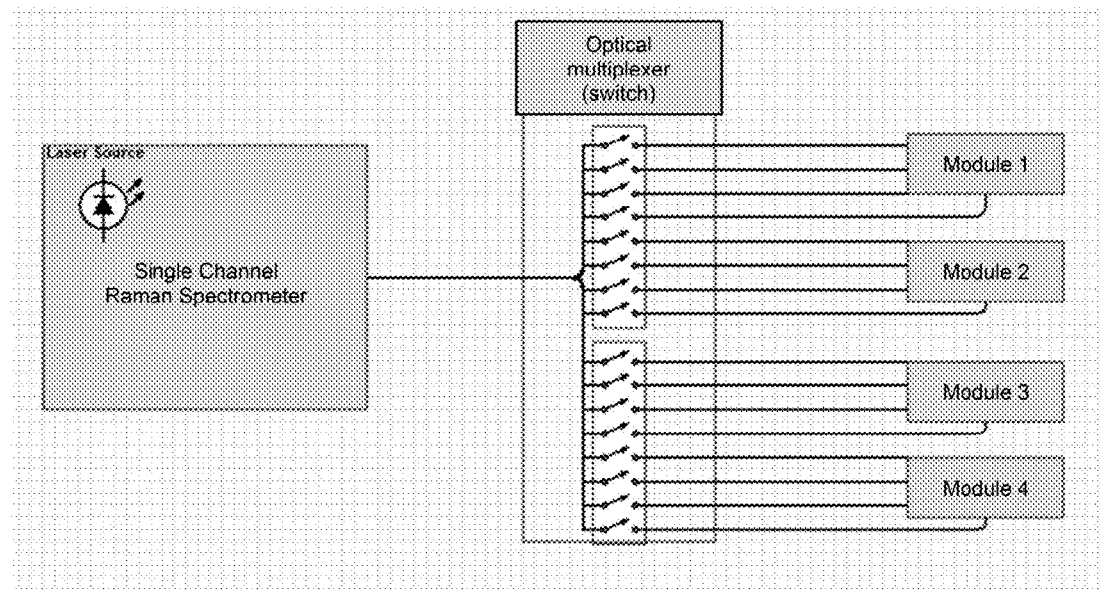
FIG. 8A-8B shows schematics of a spectrometer for use with an exemplary optical spectroscopy assembly. Provided are schematics for (A) single channel characterization and (B) multiple channel characterization.
Figure 8B:
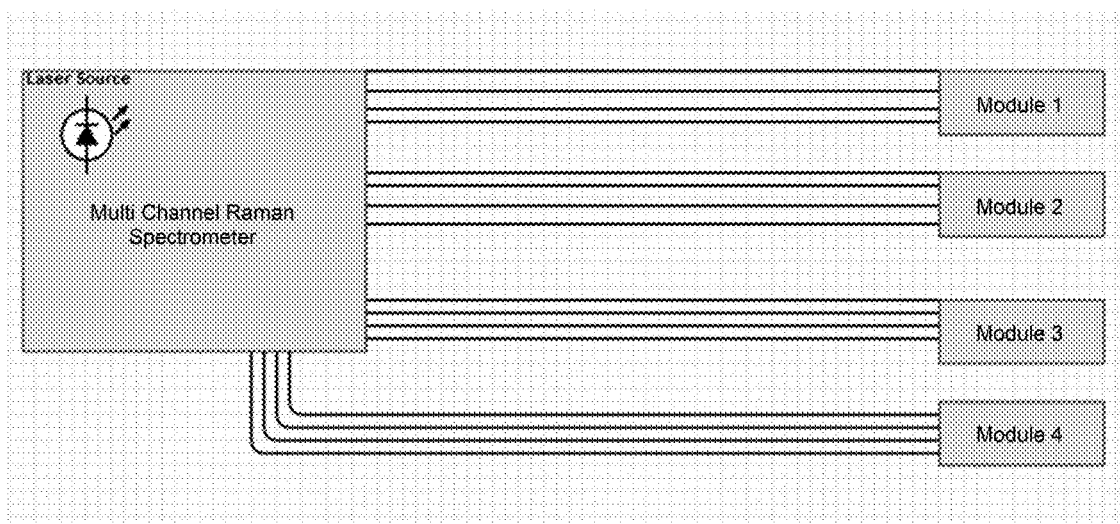

Furthermore, the optical spectroscopy assembly can include one or more components to transmit an optical signal from the sample surface to a detector, e.g., a camera, a spectrometer, a charge-coupled device, etc. In one instance, the transmitted optical signal travels from the half-ball lens and through the optical fiber, then the objective assembly, and finally the fiber optical cable before reaching the detector. The optical fibers and fiber optical cables can have any useful form, such as a multi-mode fiber, a single-mode fiber, or a bundle of fibers (e.g., a bundle of illumination and/or collection fibers). The transmitted optical signal can be provided to the detector in any useful manner. In one non-limiting instance, the detector is single channel spectrometer, and an optical multiplexer is configured to receive one or more signals from the optical spectroscopy assembly(ies) and transmit the optical signal(s) to the spectrometer (see, e.g., FIG. 8A). In yet another instance, the detector is a multiple channel spectrometer, and each optical signal from each optical spectroscopy assembly is transmitted to a single channel of the spectrometer (see, e.g., FIG. 8B).

Figure 7D:
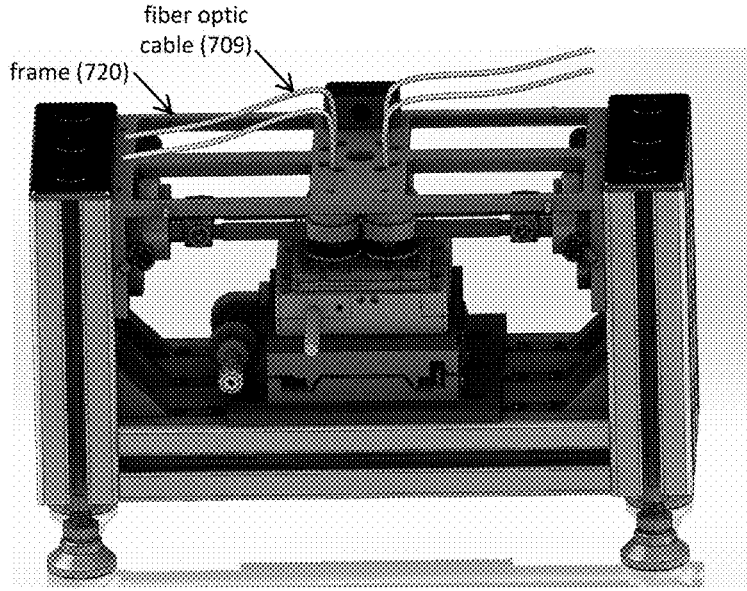

The system can include one or more components to support and/or enable the optical spectroscopy assembly. In one instance, the system includes a frame that is configured to provide at least one optical spectroscopy assembly in proximity to the distal end of each load arm. In another instance, the frame can include e.g., one or more vias to provide an optical connection (e.g., an optical fiber or cable) to the one or more optical spectroscopy assemblies. In yet another instance, the frame includes structural components to provide one or more load actuator(s) and one or more optical spectroscopy assemblies. In one non-limiting embodiment, the frame is configured to provide the load actuator(s) and the optical spectroscopy assembly(ies) in proximity to the distal end of a load arm. The frame can include, e.g., one or more vias to provide an electrical connection (e.g., a wire or cable) to the one or more load actuators (e.g., one or more electronic load actuators) and an optical connection (e.g., an optical fiber or cable) to the one or more optical spectroscopy assemblies. The frame can be optionally attached to the housing. As seen in FIG. 7D, the system can include a frame 720 including one or more vias to provide an optical connection by way of a fiber optic cable 709 coupled to the optical spectroscopy assembly or a component of the optical spectroscopy assembly (e.g., coupled to the objective assembly).

High Throughput Tribometer

There are certain tasks an operator must perform in order to setup a piece of equipment for a tribological test. Mainly, the most difficult task is that a fresh wear surface must be used for each test. Typically, a tribological test consists of a stationary "sample" made of the candidate test material and a sliding material known as a "counterface" material. The counterface material can be spherical, cylindrical or rectangular. As described herein, a counterface refers to an assembly which is used to apply a force with a spherical geometry, or ball, on the surface of the "sample". A new counterface must be attached to the tribological instrument between each test, to ensure that any material that is transferred to the counterface during the previous test is not introduced into subsequent tests. The systems for wear testing described above addressed this problem by reducing the complexity of the equipment to reduce its cost, increasing the number of test positions to improve its throughput, and separating the test positions into groups contained inside environmental enclosures to increase the flexibility of the instrument and the number of variables that can be simultaneously explored. This approach is useful but still relies on a large amount of operator interaction. The high throughput tribometer of the present invention improves throughput in tribology experiments by automating tasks that previously have only been performed by the operator. Namely, the ability for a tribometer to run without operator interaction for at least 10 separate tests is the main design improvement of this invention, though this approach is not limited to a specific number of tests. Further, the spatial and financial costs of the instrument are reduced due to the reduction of the number of test stations. The gains realized by reduced operator interactions is a huge benefit of this invention. Further, the modular design of this invention allows it to be attached to existing tribometers rather than requiring a special design made specifically to interface with the change device.

Figure 9A:
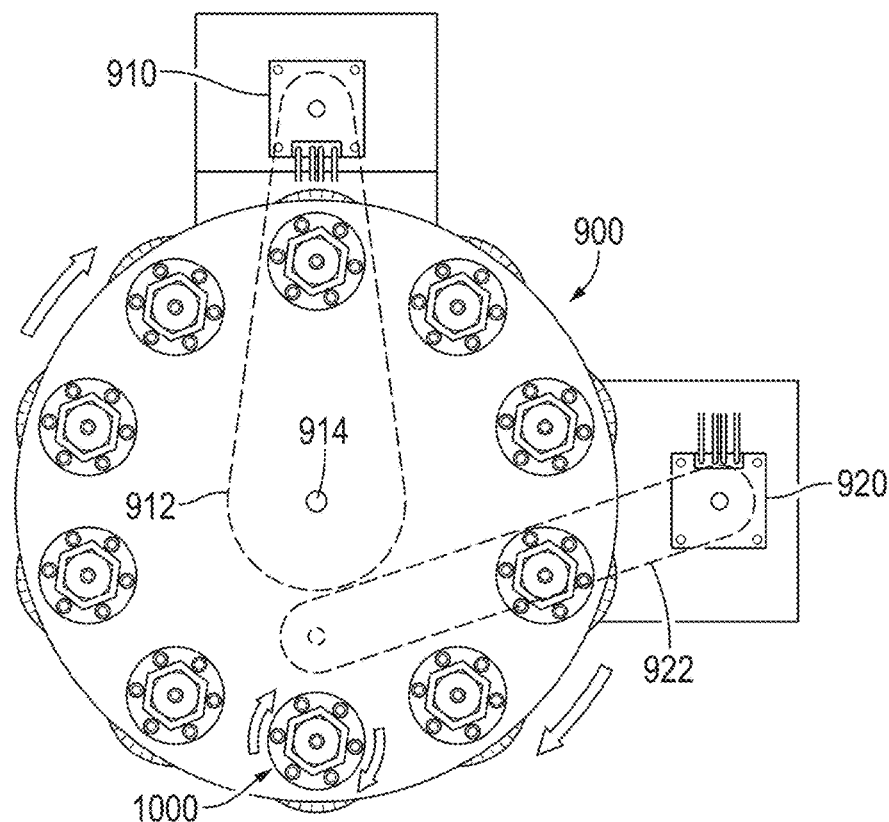
FIG. 9A is a top-view schematic illustration of a rotating carousel with ten exchange tools and an exchange drive motor for replacing a counterface in a tribometer test head.
Figure 9B:
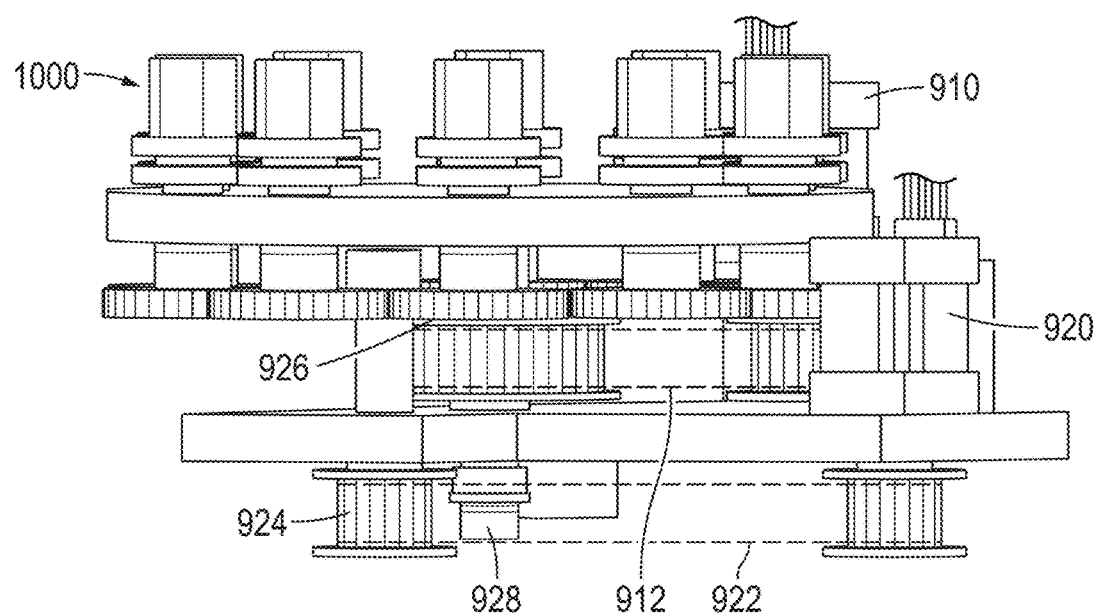
FIG. 9B is a side-view illustration of the carousel.
Figure 9C:
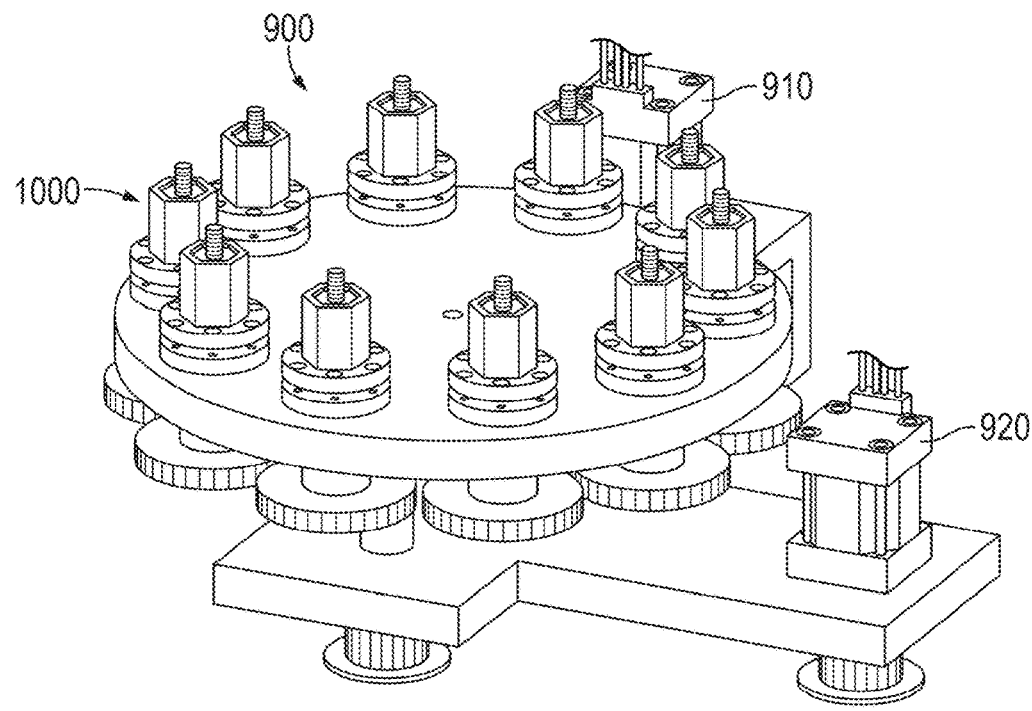
FIG. 9C is a perspective-view illustration of the carousel.

As shown in FIGS. 9A-9C, the present invention comprises a carousel 900, which holds the individual counterfaces which can be removed and replaced throughout the course of the 10 (for this example) tests. The carousel 900 can be rotated to an "exchange position" via a selector motor 910 which can use a belt 912 to drive a central rotating hub 914. The carousel 900 can comprise one or more exchange tools 1000, which is a rotating fixture designed to remove/attach a counterface 1040 from a tribometer test head 1130 (where the measurements are actually taken). In this example, there are 10 exchange tools 1000 arranged circumferentially on the carousel 900. As will be described below, the exchange tool 1000 achieves this exchange by rotating clockwise/counterclockwise and threading/unthreading a counterface 1040 in the tribometer test head 1130. Once the exchange has been completed, the carousel 900 rotates to the next position which contains an unused counterface which is ready to be attached to the tribometer test head via the next exchange tool. The exchange tool 1000 comprises a simple clutch which allows the exchange tool 1000 to tighten the counterface 1040 into the tribometer test head 1130 without causing damage to the test equipment. A torque limit of the simple clutch can be adjusted via small socket head cap screws placed circumferentially around the outside of the exchange tool 1000. To thread or unthread a counterface 1040, the exchange tool 1000 is driven via an exchange drive motor 920. The exchange drive motor 920 can be located 90 degrees offset from the exchange position (about the central drive axis 914 of the carousel 900) to reduce the assembly's impact on the test volume (takes up less space to have the motor offset). The drive motor 920 is coupled to a small gear 924 (inner exchange gear) located within a smaller radius underneath the carousel 900 via a toothed timing belt 922. As the carousel 900 rotates into the "exchange position", an inner exchange gear engages with the exchange tool gear (926, located underneath the carousel, causing the exchange tool to rotate). A central rotary encoder 928 can provide angular position feedback for the carousel 900. It provides the precise angular position of the carousel while it is rotating to move the exchange tool under the tribometer head. The carousel assembly is placed with the "exchange position" inside the test volume of the tribometer. When a counterface exchange is required, the tribometer moves to the exchange position and the counterface is exchanged by the exchange tool.

Figure 10:
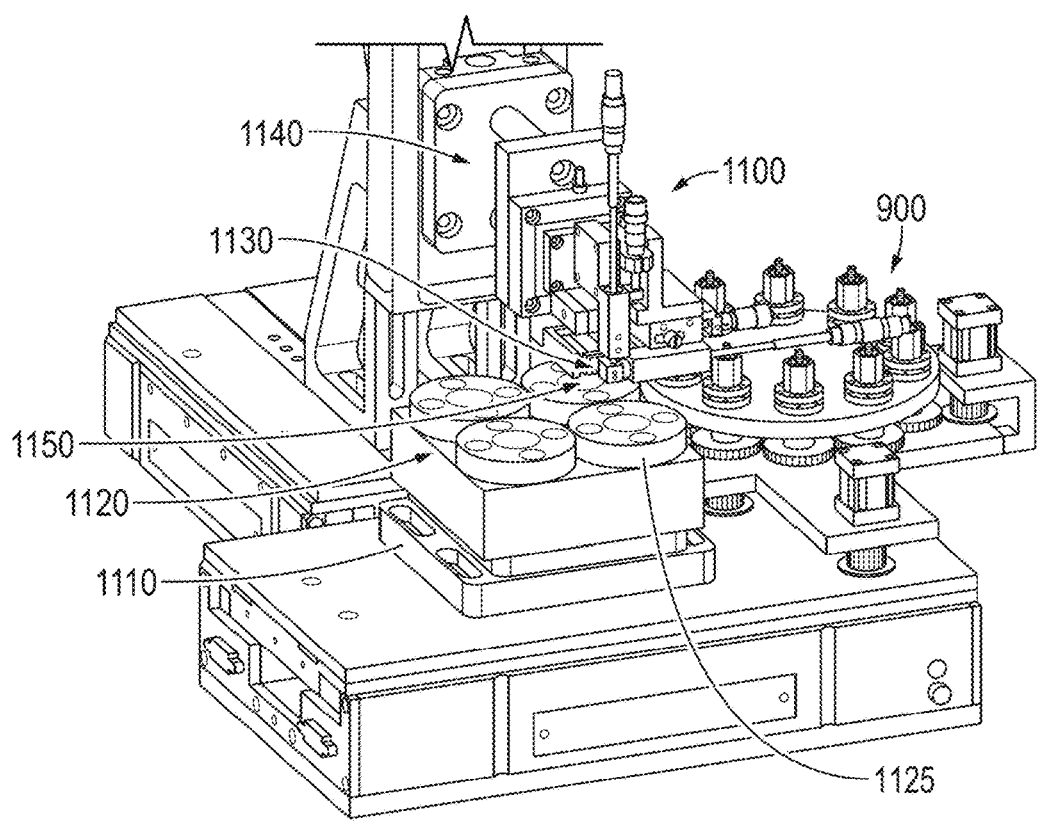
FIG. 10 is a schematic illustration of the carousel mounted in a high throughput tribometer.

FIG. 10 is a schematic illustration of the carousel 900 mounted in an exemplary high throughput tribometer 1100. The tribometer 1100 shown comprises a motorized x, y, and z linear motion stage 1110 for positioning of the test head and sample for various automated tasks, a mechanical mount 1120 for multiple test samples 1125, a single station tribometer test head 1130 and the carousel 900 containing 10 exchange tools arranged diametrically around the carousel. The tribometer 1100 further comprises a motorized Z-axis stage 1140 for loading, positioning and exchanging of a counterface 1040 in the tribometer test head 1130.

Figure 11A:
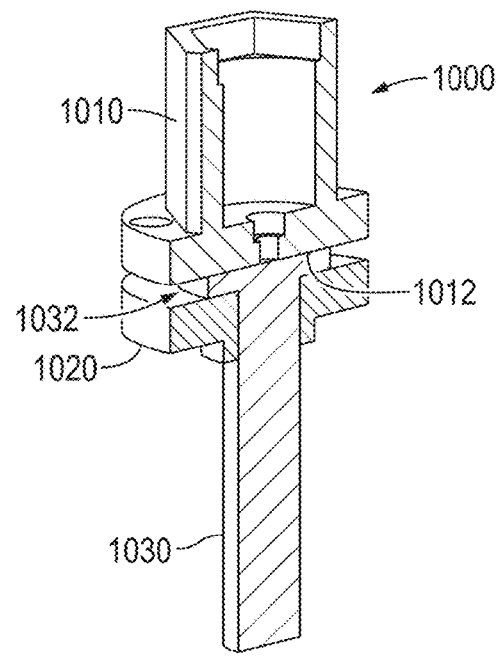
FIGS. 11A-11C illustrate an exchange tool for threading/unthreading a counterface in the tribometer test head.
Figure 11B:
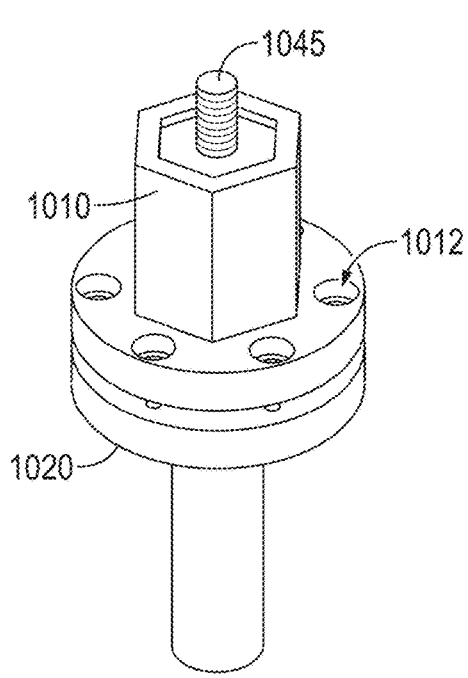
Figure 11C:
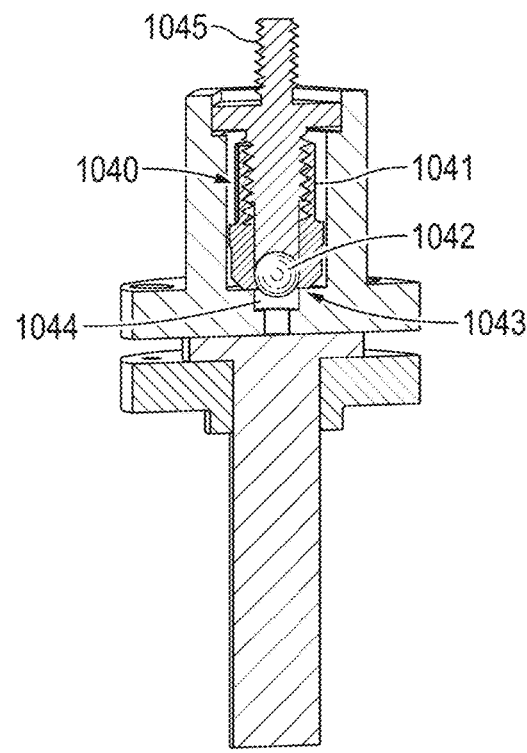

FIGS. 11A-11C illustrate an exchange tool 1000 for threading/unthreading a counterface 1040 in the tribometer test head 1130. The exchange tool's main function is to thread/unthread a counterface 1040 into the tribometer test head 1130 while not exceeding a set torque limit. As shown in FIG. 11A, the exchange tool consists of three main parts; a chuck 1010, a pressure plate 1020, and a drive shaft 1030 comprising a clutch pad 1032 which slidingly engages with a mating face 1012 of the chuck 1010. As shown in FIG. 11B, the chuck 1010 can have a hexagonal geometry which is designed to fit over the hexagonal geometry of the counterface 1040. As shown in FIG. 11C, when the counterface 1040 is lowered into the chuck 1010, a small lip 1043 limits the depth that the counterface 1040 can travel into the chuck 1010. The clutch pad 1032 of the drive shaft 1030 is held concentrically against the lower mating face of the exchange tool chuck via a pressure plate 1020. The pressure plate 1020 and clutch pad 1032 are held to the chuck 1010 via six socket head cap screws 1012 which are tightened/loosened to vary the amount of torque that the drive shaft 1030 can exert on the chuck 1010. When the drive shaft 1030 exceeds the torque limit, the clutch pad 1032 slips which prevents overtightening of the counterface 1000 into the tribometer test head 1130. The chuck 1010 is also designed to prevent contact with the test surface on the ball 1042 via the inclusion of a counterbored hole 1044 in the bottom of the counterface recess. The counterface assembly comprises three parts: a threaded interface 1045 which mates with the tribometer test head 1130, an interchangeable ball (1042, which applies a force to the sample surface), and the retention nut 1041. The retention nut 1041 is threaded onto the lower threaded portion of the threaded interface and is used to hold the interchangeable ball 1042 in place during testing and exchange. The top of the threaded interface 1045 can have a different thread which is designed to mate specifically with a threaded mounting recess of the tribometer test head 1130. Alternatively, the counterface can comprise a threaded mounting recess that interfaces with a threaded bolt of tribometer test head.

Figure 12A:
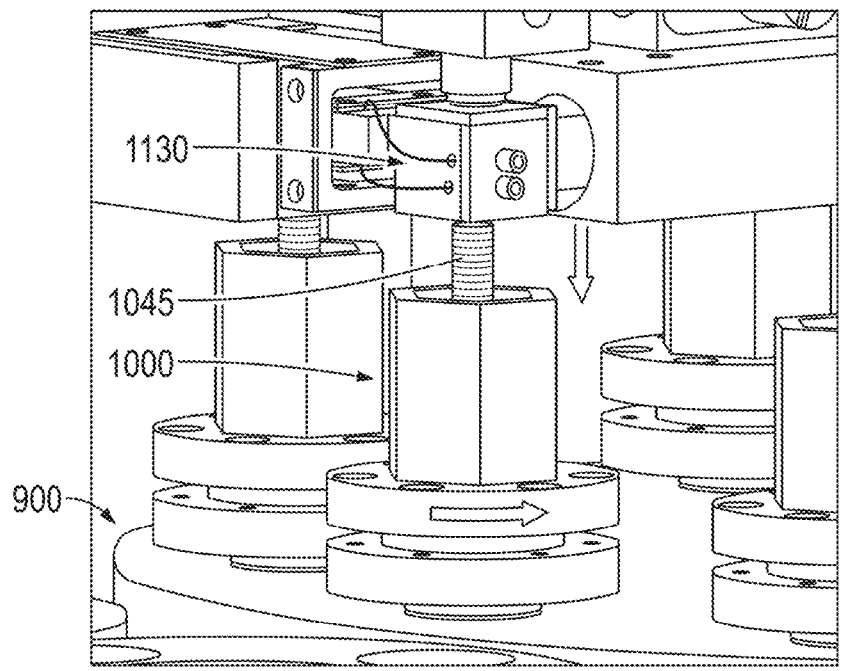
FIGS. 12A-12C illustrate the threading of a counterface into the tribometer test head.
Figure 12B:
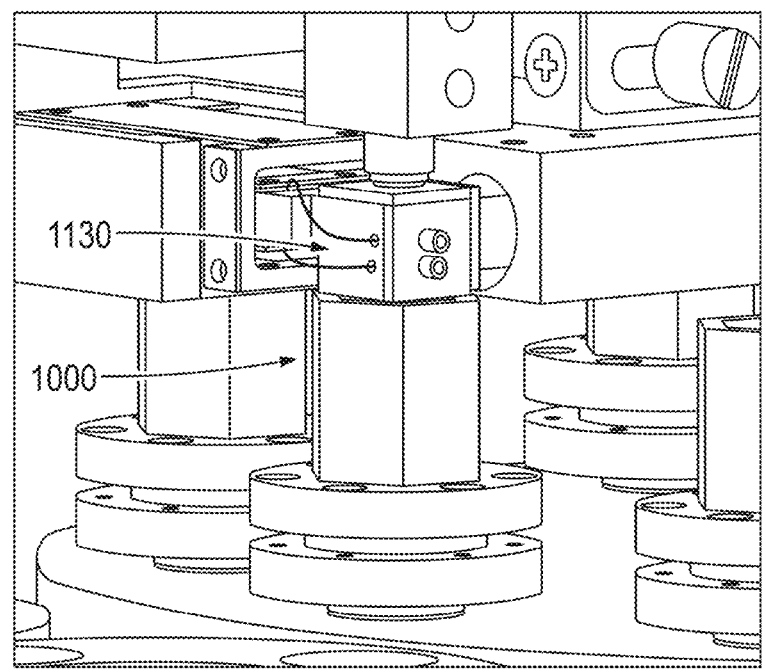
Figure 12C:
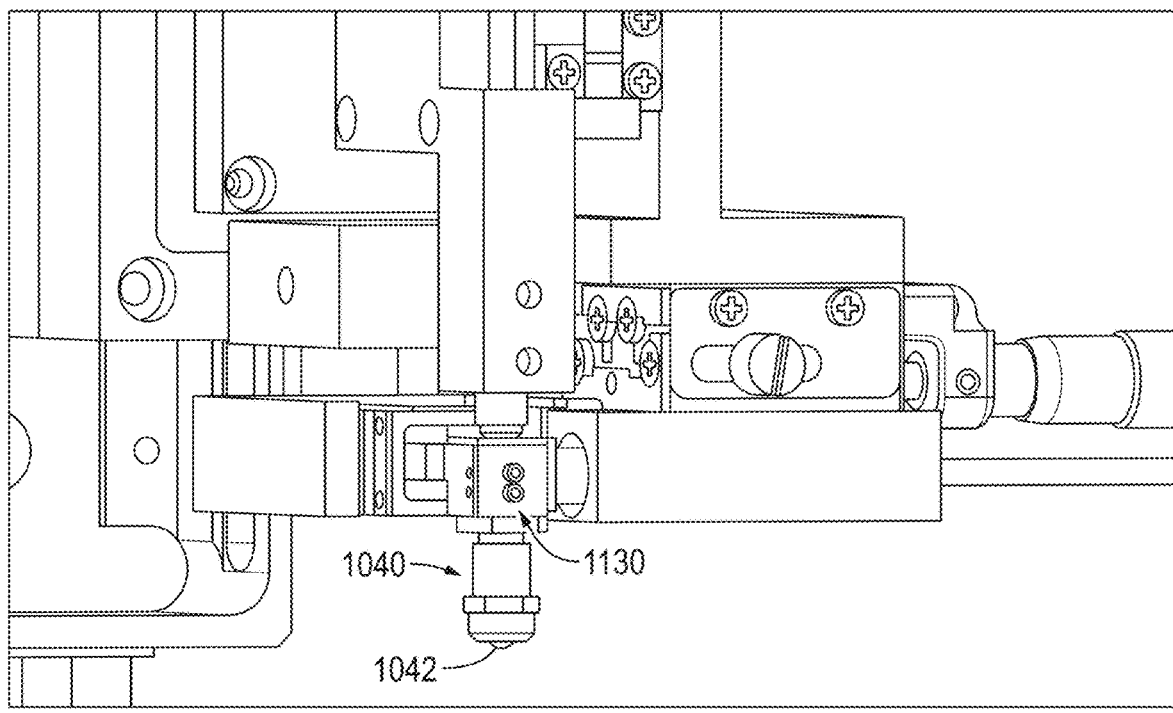

FIGS. 12A-12C illustrate the threading of a counterface 1040 into the tribometer test head 1130. During the installation of a counterface 1040 into the tribometer test head 1130, the test head 1130 is positioned directly above a single exchange tool 1000 on the carousel 900. The carousel 900 can be rotated to specify which exchange tool 1000 is positioned under the test head 1130. Software can be used to track which exchange tools contain "unused" counterfaces and which exchange tools contain "used" counterfaces. Once the tribometer test head 1130 has been positioned above the exchange tool 1000, the exchange tool 1000 begins to rotate in the "tightening" direction and the tribometer test head 1130 is slowly lowered by the motorized stage 1140 to begin the threading process, as shown in FIG. 12A. The exchange tool 1000 continues to rotate until the torque limit is achieved and the exchange tool clutch begins to slip, and the exchange tool 1000 is completely mated with the tribometer test head 1130, as shown in FIG. 12B. The exchange tool 1000 ceases to rotate and the tribometer test head 1130 is retracted away from the exchange tool 1000 with the counterface 1040 now mounted on the tribometer test head 1130, as shown in FIG. 12C.

The exchange process can be conveyed using the aforementioned rotary carousel or via a linear conveyer belt design. Both layout geometries would perform the same function, but one geometry may better enable for the invention's use in the previously described tribometer designs (to exchange the counterface in multi-position tribometers). The example above describes a rotary geometry but extrapolation of this design to linear layout is straightforward. Further, the high throughput tribometer can comprise one or more optical spectroscopy assemblies configured to obtain optical measurements (e.g., Raman spectroscopy measurements, optical microscopy measurements, etc.), as described above.

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A high throughput tribometer comprising:
   a tribometer test head configured to accept a counterface for applying a force to a sample surface;
   a carousel comprising a plurality of exchange tools;
   a selector motor for rotating the carousel and placing one of the exchange tools in an exchange position with respect to the tribometer test head; and
   an exchange drive motor for unthreading a counterface from the tribometer test head or threading a counterface into the tribometer test head.

2. The high throughput tribometer of claim 1, where the exchange tool comprises a clutch to prevent overtightening of the counterface into the tribometer test head beyond a torque limit.

3. The high throughput tribometer of claim 1, wherein the exchange tool comprises a chuck holding the counterface, a drive shaft comprising a clutch pad which slidingly engages with a mating face of the chuck, and a pressure plate to hold the clutch pad to the mating face of the chuck until a torque limit is reached.

4. The high throughput tribometer of claim 1, wherein the carousel comprises a rotary carousel.

5. The high throughput tribometer of claim 1, wherein the carousel comprises a linear conveyor belt.

* * * * *